(12) United States Patent
Steiss

(10) Patent No.: US 9,367,470 B2
(45) Date of Patent: Jun. 14, 2016

(54) BOUNDED CACHE SEARCHES

(71) Applicant: Cisco Technology, Inc., San Jose, CA (US)

(72) Inventor: Donald Edward Steiss, Richardson, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 373 days.

(21) Appl. No.: 14/070,216

(22) Filed: Nov. 1, 2013

(65) Prior Publication Data

US 2015/0127911 A1 May 7, 2015

(51) Int. Cl.
*G06F 12/08* (2006.01)
*G06F 12/10* (2006.01)

(52) U.S. Cl.
CPC ........ *G06F 12/0871* (2013.01); *G06F 12/1045* (2013.01); *G06F 2212/657* (2013.01)

(58) Field of Classification Search
None
See application file for complete search history.

(56) References Cited

U.S. PATENT DOCUMENTS

| 6,711,562 | B1 | 3/2004 | Ross et al. |
| 8,135,911 | B2 | 3/2012 | Chan et al. |
| 2005/0188157 | A1 | 8/2005 | Kashyap |
| 2006/0159170 | A1 | 7/2006 | Chiang |
| 2008/0313420 | A1 | 12/2008 | Beckmann et al. |

*Primary Examiner* — Adam M Queler
*Assistant Examiner* — Alex Olson
(74) *Attorney, Agent, or Firm* — Patterson & Sheridan, LLP

(57) ABSTRACT

Cache lines of a data cache may be assigned to a specific page type or color. In addition, the computing system may monitor when a cache line assigned to the specific page color is allocated in the cache. As each cache line assigned to a particular page color is allocated, the computing system may compare a respective index associated with each of the cache lines to determine maximum and minimum indices for that page color. These indices define a block of the cache that stores the data assigned to the page color. Thus, when the data of a page color is evicted from the cache, instead of searching the entire cache to locate the cache lines, the computing system uses the maximum and minimum indices as upper and lower bounds to reduce the portion of the cache that is searched.

21 Claims, 5 Drawing Sheets

BOUNDED CACHE SEARCHES

TECHNICAL FIELD

Embodiments presented in this disclosure generally relate to classifying data, and more specifically, to identifying indices for searching a data cache for cache lines assigned to the same data type.

BACKGROUND

Many modern computer architectures include load and store machine code instructions for memory access. Hardware is frequently used to accelerate the performance of these load and store operations. One class of hardware used to increase performance is a data cache or cache memory. Many different types of data, however, may be stored in a cache which makes distinguishing between data types difficult. To more easily identify data of a particular type, a computing system may assign each cache line in the cache to a particular data page type (i.e., a page color).

Some tasks, such as coherence operations or invalidations, require the computing device to search the data cache in order to identify the cache lines assigned to a specific page color. For example, the device may search each set of the data cache as well as each of the ways within the sets. By searching a cache tag for the page color, the computing system may be able to quickly identify the specific type of data—e.g., a data packet, stack data, scratch data, and the like—stored in the cache line. Searching through the individual sets and ways within the data cache, however, is a time consuming task which may decrease the performance of the computing device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
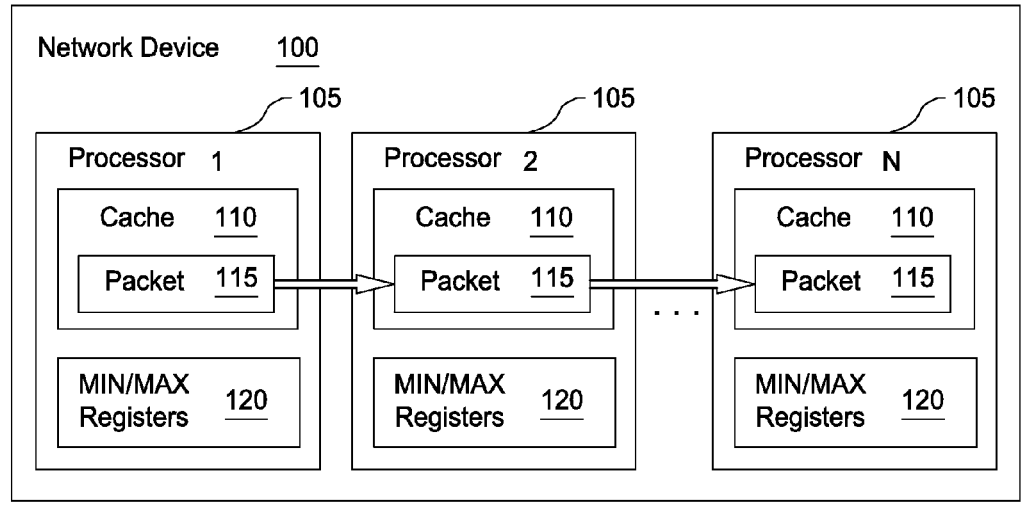
FIG. 1 is a network device that forwards data packets between hardware units, according to one embodiment described herein.

One embodiment presented in this disclosure includes a memory storage system that includes a data cache comprising a plurality of cache lines, where each of the plurality of cache lines is associated with a tag that assigns the cache line to a same page type. The memory storage system also includes a first register configured to store a minimum cache index associated with the plurality of cache lines assigned to the same page type and a second register configured to store a maximum cache index associated with the plurality of cache lines assigned to the same page type. The memory storage system also may include logic configured to perform a plurality of cache allocation operations to store data to the plurality of cache lines and determine the minimum cache index stored in the first register and the maximum cache index stored in the second register based upon index values associated with the plurality of cache allocation operations. Upon receiving a prompt to remove the plurality of cache lines from the data cache, the logic is configured to search a subset of the data cache for the plurality of cache lines assigned to the same page type, where an upper boundary of the subset is determined by the maximum cache index and a lower boundary of the subset is determined by the minimum cache index.

Another embodiment presented in this disclosure is a method that includes performing a cache allocation operation to store data to one of a plurality of cache lines in a data cache, where each of the plurality of cache lines is associated with a tag that assigns the cache line to a same page type. Upon determining that an index value associated with the cache allocation operation is less than a current value of a minimum cache index in a first register, the method replaces the current value of the minimum cache index with the index value. Upon determining that the index value is greater than a current value of a maximum cache index in a second register, the method replaces the current value of the maximum cache index with the index value. Upon receiving a prompt to remove the plurality of cache lines from the data cache, the method searches a subset of the data cache for the plurality of cache lines assigned to the same page type, where an upper boundary of the subset is determined by the maximum cache index and a lower boundary of the subset is determined by the minimum cache index.

Another embodiment presented in this disclosure includes a computing device that includes a memory management unit configured to associate received virtual addresses with memory pages and page types and a data cache configured to use physical addresses associated the memory pages to store data into a plurality of cache lines where a data cache tag memory maintains the page type of the memory page associated with a cached address. The computing device also includes a first register configured to store a lower boundary of a subset of the data cache that stores cache lines assigned to a same page type and a second register configured to store an upper boundary of the subset of the data cache. The computing device includes control logic that uses the upper and lower boundaries to search the subset of the data cache for modified and unmodified cache lines of the same page type.

Example Embodiments

The embodiments described below improve the time required to perform cache operations on data stored in the data cache of a processor in a computing system while maintaining an optimized programming model for software. This is beneficial, for example, in latency-sensitive communication systems where packet processing time must be minimized. When storing data into cache lines in the data cache, the computing system may assign each cache line to a page color. In addition, the computing system may monitor when the cache lines are allocated (i.e., when data is stored into the cache lines) to see if the page color assigned to the cache line matches a particular page color. If so, the computing system may compare a respective index associated with the cache line with the indices of previously allocated cache lines assigned to the particular page color to determine maximum and minimum indices for the cache lines assigned to that page color. These indices can be used as upper and lower bounds to define a block of the cache (e.g., a subset of the cache lines) that stores the data assigned to the page color. Thus, when the computing system decides to evict the data associated with that page color, instead of searching the entire cache to locate the cache lines assign to the particular color (which may be interleaved with cache lines assigned to different page colors), the computing system can restrict the search to a portion of the cache using the maximum and minimum indices as upper and lower bounds.

In one embodiment, as cache lines assigned to a specific page color are modified, the computing system tracks the respective indices associated with the modified cache lines to determine which index is the maximum-modified index—i.e., which index of the modified caches lines is the greatest. After determining to evict the data of the specified page color, the computing system needs only to search the data cache from the minimum index (as described above) to the maximum-modified index to identify cache lines that have been modified that now should be written out to higher cache levels (e.g., main memory) or to a cache in a downstream hardware unit. That is, by identifying the maximum-modified index, the computing system searches only the portion of the data cache that has modified cache lines of the specified page color. Once the computing system searches between the minimum index and the maximum-modified index, the system may send an instruction to a downstream hardware unit that all the modified data has been written out and the downstream hardware unit can now begin to process the data assigned to page color. In parallel, the computing system may continue to search the data cache (e.g., from the maximum-modified index to the maximum index) to indentify and invalidate the rest of the cache lines in the data cache assigned to that page color.

Maintaining the bounds (e.g., the minimum, maximum, and maximum-modified index) using hardware elements means that software applications do not need to maintain a list of modified addresses or construct a buffer containing the modified data. Instead, the hardware elements are able to efficiently search the cache to identify and evict/invalidate data assigned to a specific page color.

FIG. 1 is a network device 100 that forwards data packets between hardware units, according to one embodiment described herein. Although a network device 100 is shown (e.g., a router, switch, bridge, server, and the like), the embodiments described herein may be used with any computing system that processes data using a data cache. Network device 100 includes a plurality of hardware units—e.g., processors 105—that may establish a data path for processing network packets 115. For example, the network device 100 may pass the network packet 115 sequentially between the processors 105. Each processor 105 may process and/or modify the packet 115 before forwarding the packet to the next (i.e., upstream) processor 105. Ultimately, the processed packet 115 may be forwarded to another network device or a client device using a LAN or WAN.

The processors 105 may be individual semiconductor chips or may be a plurality of distinct processors 105 arranged on a single chip. The processors 105 may be specially designed for specific purpose (e.g., an ASIC) or may be general purpose processors capable of performing the functions recited herein. Each processor 105 includes a data cache 110 which stores the packet 115. The caches 110 may include volatile memory (e.g., DRAM or SRAM) or non-volatile memory (e.g., resistive RAM or Flash). Using one or more allocate operations, each processor 105 may store the packet 115 into its respective cache 110. Because the data size of the packet 115 may exceed the amount of data that can be stored in a single cache line, the cache 110 may store the packet 115 using a plurality of cache lines, which may be non-contiguous. That is, the packet 115 may be broken into data chunks that may be stored in various cache lines within the cache 110. The packet 115 may be stored in cache lines that are interleaved with cache lines that store other types of data—e.g., stack data or scratch data—that are assigned to different page colors.

In one embodiment, the cache 110 may be organized into a plurality of sets and ways. For example, a cache 110 may be divided into 1024 sets which each hold four cache lines or ways. The processor may use a data address (typically a physical address) associated with each data chunk to identify the set—e.g., 10 bits ($2^{10}=1024$) of the address may define the set. The way addresses are determined by matching a tag address (shown in FIG. 2) with the four address tags associated with the set thereby enabling the cache to identify the cache line associated with that address. In this manner, the packet 115 may divide the packet 115 into data chunks that each have a physical address that can be used to store, retrieve, and modify the data in cache 110.

The data stored in the cache line (and the cache lines themselves) may be assigned to a particular page type—i.e., a page color. The page color enables the network device 100 to easily identify data types stored within the cache 110. For example, a cache tag associated with each cache line may include a bitmap that indicates the page color of the cache line. By searching through the cache tags, the processor 105 quickly determines what page color is assigned to the cache line. In one embodiment, the data chunks of packet 115 are all assigned to a specific (or same) page color. When, for example, Processor 1 wants to pass the packet 115 to Processor 2, Processor 1 may instruct cache 110 to evict and/or invalidate the packet 115 from its own cache 110 and pass the modified data chunks to Processor 2. To do so, the cache 110 may use the page color to quickly identify the data chunks of packet 115.

To narrow down the cache lines that have to be searched, the processors 105 include maximum/minimum registers 120 that can store the index of the cache line associated with packet 115 having the "smallest" index of cache 110 and the index of the cache line associated with packet 115 having the "greatest" index of cache 110. Stated differently, the maximum/minimum registers 120 store upper and lower bounds that define a portion of cache 110 that includes the cache lines storing the packet 115. Thus, the processor 105 need only search between these bounds for cache lines of the specific page color assigned to packet 115, rather than searching the entire cache 110 for cache lines storing portions of the packet 115. For example, the cache 110 may begin searching the cache tags at the minimum index for the specific page color (ignoring the cache lines that are assigned to different page colors) and continue until the cache 110 reaches the cache tag at the maximum index.

As used herein, an "index" is any value that may be used to identify either a plurality of cache lines or an individual cache line in a data cache. For example, the network device may use the sets as an index. In this case, the minimum index may be Set 3 while the maximum index is Set 50. Thus, the network device 100 need only search the ways in Sets 3-50 when evicting and/or invalidating cache lines of the particular color. In other embodiments, the index may be a combination of sets and ways. For example, the index may be the concatenation of the bits defining the set and way values of a cache line. For example, if the "lowest" indexed cache line of packet 115 is Set 10, Way 3, the index may be "000000101011" (assuming a 4-way, 1024 set associative cache) where the ten most-significant bits are the set value and the two least-significant bits are the way value. So long as the data chunks are stored in the cache in the same manner the cache lines are searched, the set and way values may be combined in any manner to provide minimum and maximum indices which can be used to define a portion of cache 110 that includes all the cache lines associated with a specific page color. For example, in another embodiment, the way values may instead be used as the most-significant bits while the set values are the least-significant bits.

Figure 2:
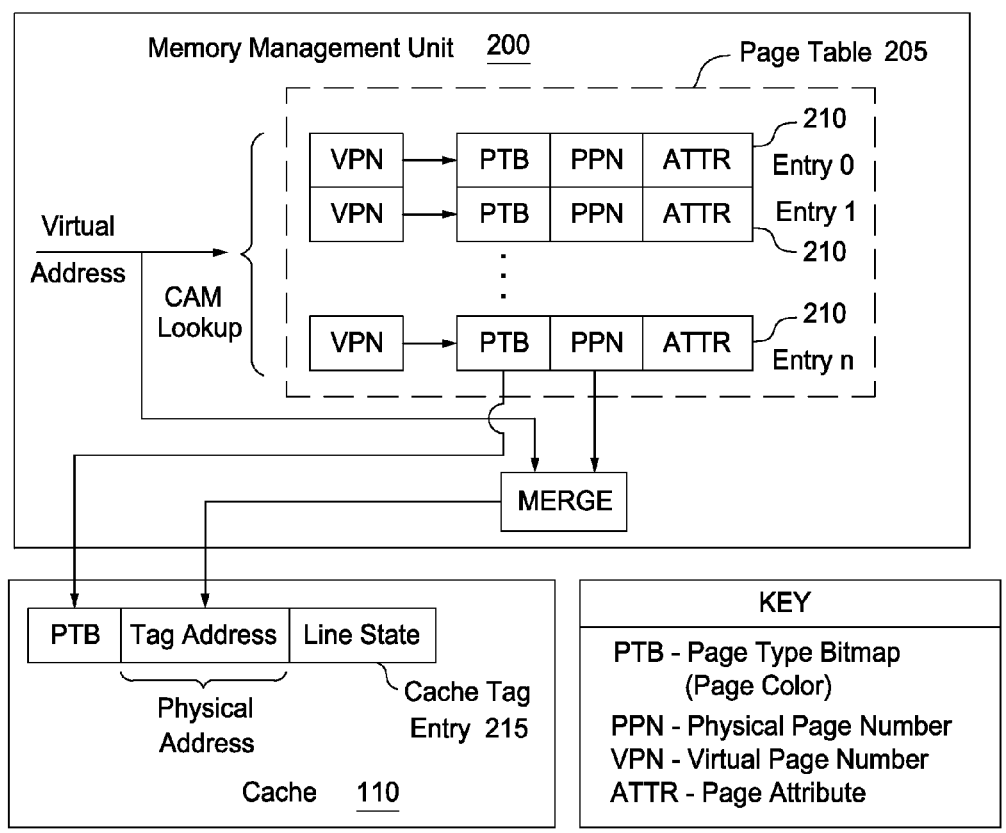
FIG. 2 illustrates a memory management system for assigning data stored in a data cache to a page color, according to one embodiment described herein.

FIG. 2 illustrates a memory management system for assigning data stored in a data cache to a page color, according to one embodiment described herein. As shown, each processor 105 includes a memory management unit (MMU) 200 that translates a virtual address to a physical address. The MMU 200 receives a virtual memory address associated with a chunk of data. In one embodiment, the chunk of data has the same data size (e.g., number of bytes) as a cache line in cache 110. MMU 200 includes a page table 205 with a plurality of page entries 210 (e.g., Entry 0, Entry 1, and so forth), which in one embodiment, may be stored in a content-addressable memory (CAM).

To translate the received virtual address into a physical address, the MMU 205 derives a virtual page number (VPN) from the virtual address. With the VPN, the MMU 205 performs a CAM lookup to identify an entry 210 that has the same VPN as the virtual address. If a matching entry 210 is found the MMU 200 combines the physical page number (PPN) in the matched entry 210 with a portion of the virtual address to yield the tag address (or physical address) associated with the data chunk. The tag address may then be used to access—e.g., allocate, modify, invalidate, or evict—the cache line by deriving the set and way as discussed above.

In addition to performing the address translation, the MMU 200 may assign the page type bitmap (PTB)—i.e., the page color—for the cache tag entry 215. As shown, the virtual address is used to index into the page table based on a VPN. The PTB associated with this virtual page number is then assigned to each cache line. That is, the cache tag entry 215 inherits the page color/PTB of the parent page as defined by the page table 205 when the cache line is allocated. In this manner, the entries 210 of the page table 205 may be configured so that all the data chunks of a network packet are assigned to the same page color. For example, the page table 205 may be configured such that the virtual addresses associated with the data chunks of the network packet map to either the same entry 210 or to entries 210 that have the same PTB values. Thus, when the cache tag entries 215 are generated and the data chunks are allocated into cache 110, the inherited PTB values are the same.

In one embodiment, the PTB inherited from the page table may have multiple page colors. As such, the cache line that inherits that bitmap is also assigned to multiple page colors. For instance, each bit location in the PTB that has a logical one means the cache line is assigned to the page color associated with that bit position in the bitmap. If, for example, a cache line is assigned to both a "red" and "orange" page color, than if the cache searches for either of these page colors, the cache line will be identified. Permitting a cache line to be assigned to multiple page colors is useful when, for example, one color is specific to a data type and a second color is specific to a coherence protocol associated with the cache line.

The page table entries 210 also include other attributes (ATTR) which may not be relevant to the present discussion. Examples of these attributes include a page size, a page valid indicator, page permissions, and the like. Moreover, the cache tag entry 215 may include line state information which indicates whether the associated cache line is valid, shared with other caches, or has been modified.

Figure 3:
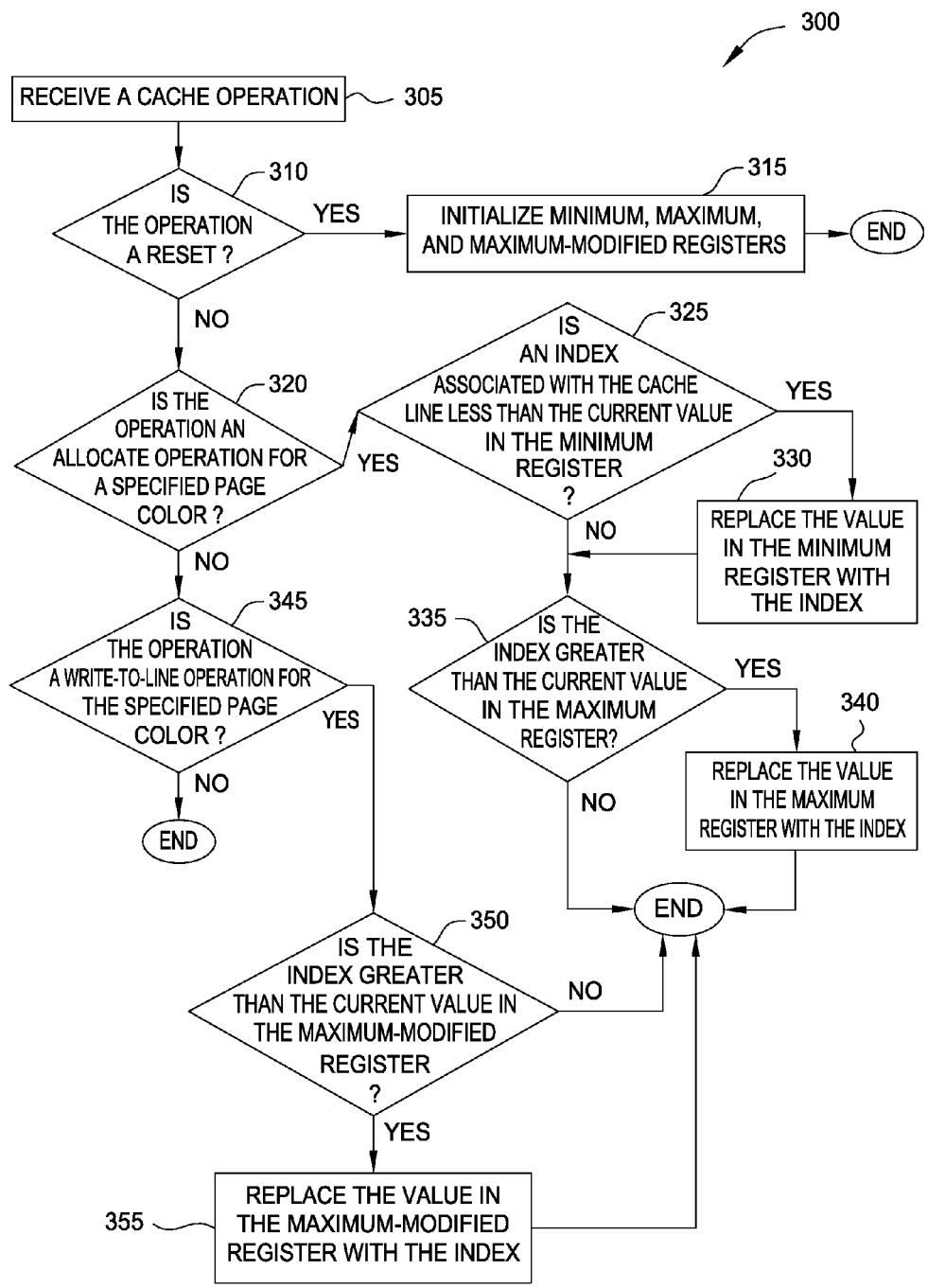
FIG. 3 is a flow chart for identifying maximum and minimum indices associated with cache lines assigned to a specific page color, according to one embodiment described herein.

FIG. 3 is a flow chart for identifying maximum and minimum indices associated with a data of a particular page color stored in data cache, according to one embodiment described herein. Method 300 begins when a processor receives a cache operation at block 305. For example, the network device may have a received a new network packet which is then passed to a hardware unit for processing. Alternatively, the packet may be passed to hardware unit from an upstream unit in the network device which has finished processing the packet. However, method 300 is not limited to processing a network packet but rather may be used with any data processing system.

At block 310, the processor determines if the received operation is a reset. If so, at block 315, the processor may initialize registers used to provide upper and lower bounds when searching for data of a particular page color in the data cache. The processor may include three such registers—a minimum index register which provides a lower bound, a maximum index register which provides an upper bound, and a maximum-modified register which provides an upper bound when searching for modified cache lines. The processor may initialize the register by loading default values into the registers.

Figure 4A:
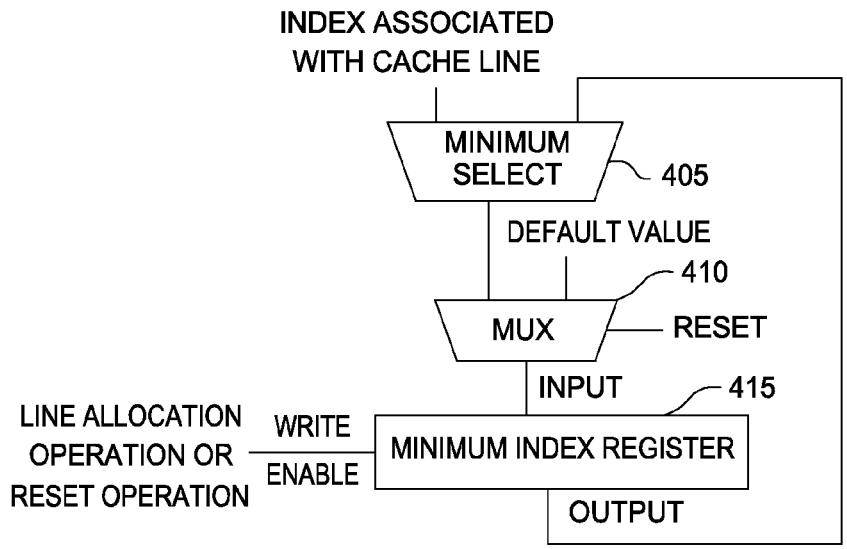
FIGS. 4A-4C illustrate logic for deriving indices for searching a data cache for cache lines assigned to a specific page color, according to one embodiment described herein.
Figure 4B:
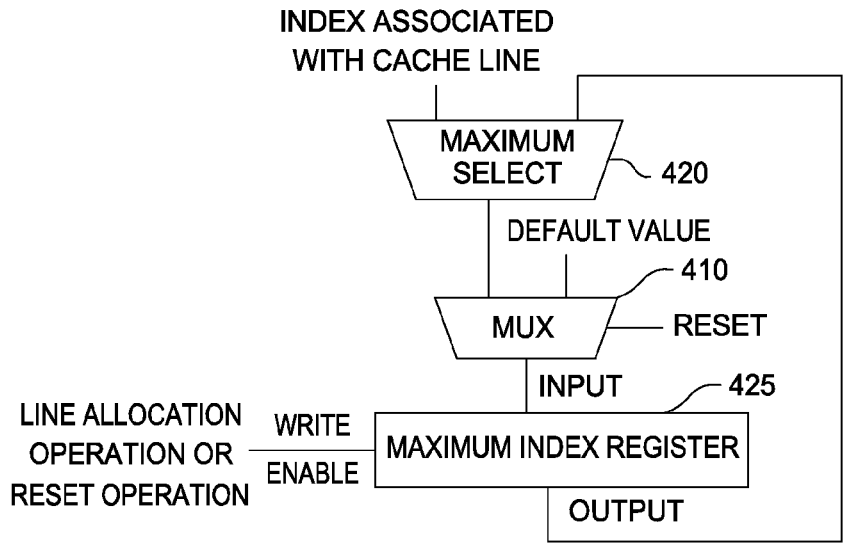
Figure 4C:
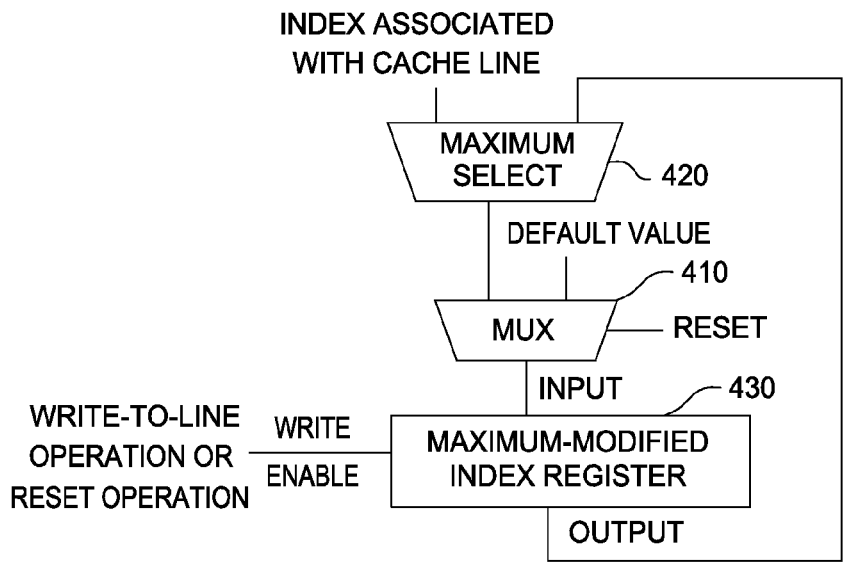

FIGS. 4A-4C illustrate logic for deriving and storing indices in the three registers described above. The registers 415, 425, and 430 (and the associated logic in circuitry 401, 402, and 403) may be embedded into the processor but this is not a requirement. For example, the circuitry 401, 402, and 403 may be located on a separate chip or memory device within the computing device.

To load the default values into the minimum, maximum, and maximum-modified index registers 415, 425, and 430, a multiplexer (mux) 410 uses the reset signal as a selector signal to load the default values into the respective registers. When a reset operation is received, the processor may provide a write enable signal to the registers which permits the output of the mux 410 (i.e., the default value) to be stored in the registers 415, 425, and 430. The processor may receive an instruction to perform a reset operation when, for example, an upstream hardware unit is passing a processed network packet to the processor or when the network device has received a new packet.

Returning to FIG. 3, at block 320, the processor determines whether the operation is an allocate operation for a specified page color. That is, the processor may be concerned only with cache lines that are assigned to a particular page color. For example, the processor may only proceed to block 325 if the allocate operation stores data chunks of a network packet into the cache but not if stack data, scratch data, or a different network packet is being stored into the cache (which are different data types and are thus assigned to different page colors). That being said, in other embodiments, the processor may evaluate received operations to identify multiple page colors. For example, the processor may have two sets of registers—three registers for storing indices associated with cache lines of a first page color and another three registers for storing indices associated with cache lines of a second page color. In this manner, the processor may be able to store the minimum and maximum indices for a plurality of network packets or for different data types (e.g., a network packet and stack data).

If the current operation is an allocation operation for the specified page color (or colors), method 300 proceeds to block 325 where the index of the cache lines identified in the allocation request are compared to the current value stored in the minimum index register. As explained above, the index may be any value that can be used to identify either a subset or individual cache lines in a data cache—e.g., the set, the way, or combinations thereof. If the index of the current cache line being allocated is less than the current value stored in the minimum index register, at block 330, the processor replaces the current value stored in the register with the index of the cache line. This logic is shown in FIG. 4A. There, the index of the cache line is compared to the output of the register 415 by the minimum select circuit 405. If the index is less than the current output of the minimum index register, the index is then passed through the mux 410 to the input of the minimum index register 415. Because the processor is currently performing a line allocation operation, the write enable signal is active resulting in the index of the cache line to be stored into the minimum index register 415. If, however, the index is not less than the current value stored in the register 415, the output value is re-stored into the minimum register index 415 (i.e., the value stored in register 415 remains unchanged).

As the data chunks of the network packet are allocated into the cache, the processor may continually evaluate the indices used to store the data chunks into the cache lines. Doing so ensures that the minimum index register 415 stores the index of the lowest cache lines assigned to that page color (i.e., the lower bound).

Returning to FIG. 3, at block 335, the processor determines if the index of the cache line is greater than the current value in the maximum index register. If so, at block 340, the processor replaces the current value in this register with the index of the cache line. This logic is shown in FIG. 4B where the index of the cache line is compared to the output of the maximum index register 425 using the maximum select circuit 420. If the index is greater than the output, the index is instead stored into the register 425. If not, the value stored in register 425 remains unchanged. Because the processor may continually evaluate the indices used to store the data chunks of the network packet into cache lines, this ensures that the highest index of the cache lines assigned to the specific page color (i.e., the upper bound) is stored in the maximum index register 425. After blocks 335 or 340 have completed, method 300 may end until the processor determines to perform another cache operation in which case method 300 repeats.

If the received cache operation is not a reset, allocation, or invalidation operation, at block 345, the processor determines if the cache operation is a write-to-line operation for the specified page color. As used herein, the write-to-line operation may be any operation that modifies the data chunk stored in the cache line. For example, when processing a network packet, the processor may change the data in the packet—e.g.,
the packet's header. Thus, the cache lines that store the packet's header (or some portion thereof) is modified by the processor. As shown in FIG. 2, the cache line has a cache tag entry 215 which stores a line state of the cache line. This line state may include a flag for indicating whether the data stored in the cache line is shared (i.e., is the data in the cache line is the same across multiple data caches) or has been modified (i.e., the data in the cache line is different from data stored in a different memory element). To maintain cache coherency, the line state is used to indicate when the modifications made to data in a cache line should be propagated throughout the computing system—e.g., to memory elements that store data that has the same physical address as the modified data. Thus, when a write-to-line operation is performed by the processor the line state of the cache tag entry 215 may be changed to indicate that the data stored in the cache line has been modified.

At block 350 of method 300, the processor may compare the index of the modified cache line to the current value in the maximum-modified index register. If the index is greater than the value currently stored in this register, at block 355, the value of the register is replaced by the index. This logic is shown in FIG. 4C where the maximum select circuit 420 compares the index of the modified cache line to the output of the maximum-modified index register 430 and outputs the greatest value to mux 410. Because a reset operation is not being performed, the mux 410 passes the output of the maximum select circuit 420 to the input of register 430 where it is then stored.

Because the processor evaluates the write-to-line operations as they are performed, method 300 ensures that the greatest index of the modified cache lines is stored in register 430. Thus, assuming the cache is searched from the lower bound (i.e., the index stored in the minimum index register 415) to the upper bound (i.e., the index stored in the maximum index register 425), once the processer reaches the index value stored in the maximum-modified index register 430, the processor knows that there are no other modified cache lines of the specified page color in the cache that have not yet been found.

Furthermore, instead of identifying the maximum-modified index, in other embodiments, the processor may identify the minimum-modified index. For example, the processor may search the cache for cache lines of the specified page color from the upper bound towards the lower bound. Thus, the register 430 may store the minimum-modified index to alert the processor when there are no other modified cache lines of the specified page color left the cache that have not already been found. Accordingly, the particular index stored in register 430 may vary depending on how data is stored and searched in the cache.

In one embodiment, however, method 300 may not perform blocks 345, 350, and 355. That is, the method 300 may indentify only the minimum and/or maximum indexes which are then used to search the cache for cache lines assigned to the specified page color. Regardless of whether method 300 performs blocks 345-355, the logic circuits 401, 402, and 403 of FIGS. 4A-4C illustrate cost-effective circuits that can quickly track and maintain the respective indices without adding a significant amount of latency or overhead when performing the cache operations. Moreover, in one embodiment, the network device may include additional hardware or firmware logic that permits software to read the values of the minimum, maximum, and maximum-modified registers. Providing this function may help with design verification and testing of the hardware design.

In another embodiment, in addition to responding to allocation or write-to-cache operations, the minimum, maximum, and maximum-modified registers may be updated as shown by blocks 325-340 in response to a direct tag access operation that manually updates a tag value that matches the specified page color. That is, if the page color of the updated tag value is the page color associated with the three registers, the network device may determine if the index associated with the update tag value is a minimum or maximum index value. The direct tag access operation is typically issued by software when constructing cache line mappings for future memory operations.

Figure 5:
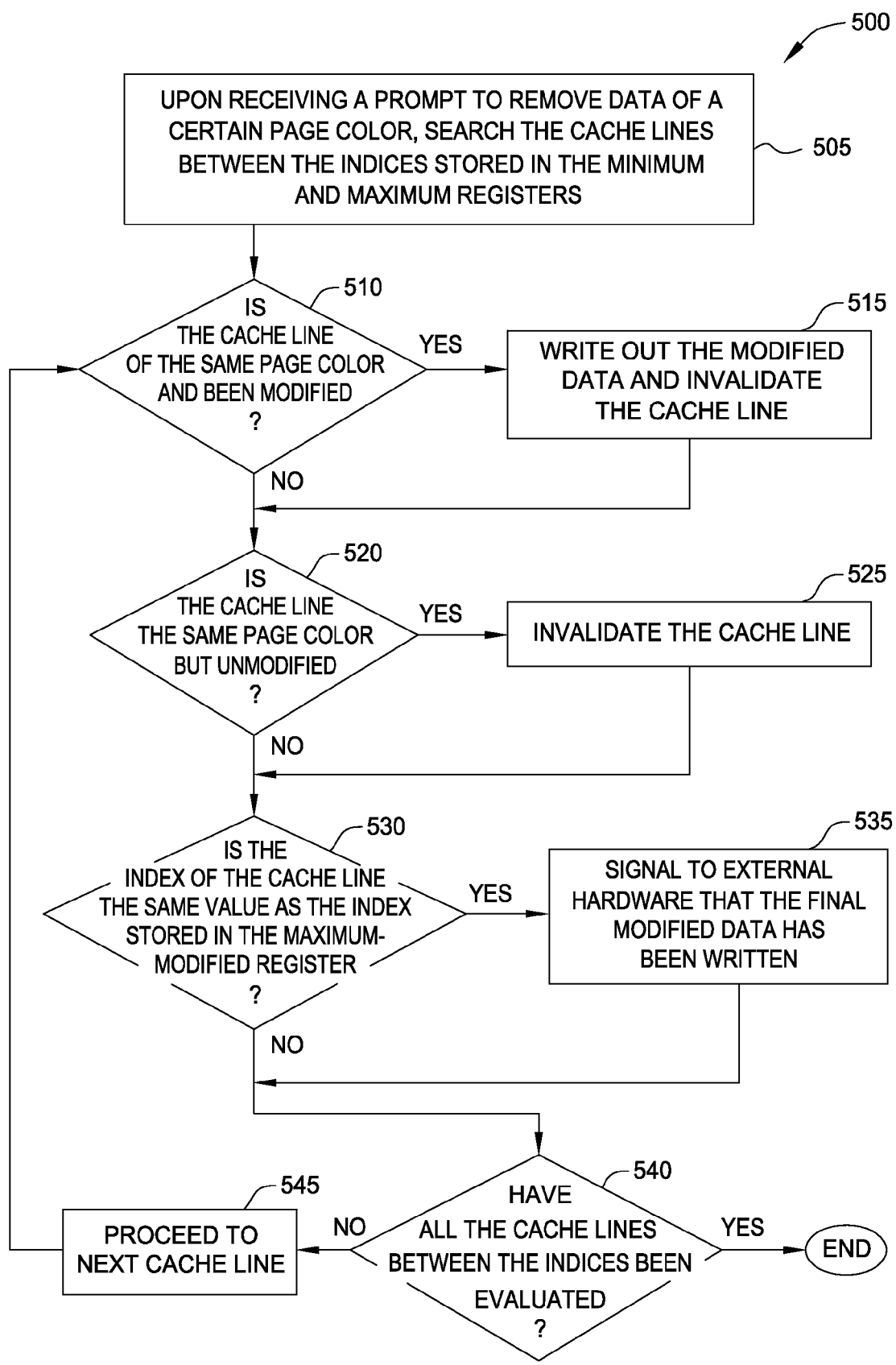
FIG. 5 is a flow chart for evaluating and evicting data in cache lines assigned to a particular page color using the maximum and minimum indices, according to one embodiment described herein.

FIG. 5 is a flow chart for evicting and evaluating data of a particular page color for a data cache using the maximum and minimum indices, according to one embodiment described herein. Method 500 begins at block 505 after a cache receives a prompt to evict or invalidate data of a certain page color. As used herein, "evicting" a cache line means that data is removed from the cache and sent to another memory element to, for example, maintain cache coherency between the memory elements. "Invalidating" a cache line means that the cache line is either logically or electrically removed from the cache. For example, the cache tag entry of the cache line may include a validity bit, which, when the cache line is invalidated, is set to a value to indicate the cache line is available. The cache may then store another received data chunk in that cache line. Alternatively, the cache may erase the cache line (e.g., replace the cache line with null values) when invalidating the line. Eviction is different from invalidation in that the data associated with an evicted cache line has been modified, and thus, is transferred to other cache memories that store data with the same physical or virtual address. In contrast, cache lines that are invalidated may store shared, unmodified data that does not need to be sent to other memory elements.

After receiving the prompt, the cache may search for all cache lines assigned to the particular page color using the lower and upper bounds stored in the minimum and maximum index registers. To perform the search, the network device may include control logic (e.g., software, hardware, firmware or some combination thereof) that searches a subset of the data cache defined by the lower and upper bounds. There are many techniques for using the lower and upper bounds to search the cache. In one embodiment, the cache or processor may perform a linear search through all the sets and ways. For example, the lower bound may define the lowest set in the cache that includes a cache line storing data from the packet (e.g., Set 2) while the upper bound my defined the highest set in the cache that stores data from the network packet (e.g., Set 560). The processor may then start from either the upper or lower bound and search each set (and way within the set) to identify the cache lines assigned to the specified page color. Once the opposite bound is reached, the processor then knows there are no other cache lines assigned to the specified page color in the cache that have not yet be found. In this manner, the other cache lines—e.g., the cache lines in Sets 1 and 561-1024 (assuming a 1024 set cache)—do not have to be searched thereby saving time and resources. Another technique for searching the cache includes a linear search through all the sets between the upper and lower bound while searching in parallel the ways within the set (i.e., the processor is able to search all the ways within a set simultaneously). Regardless of the particular technique implemented, the upper and lower bounds may be used to identify portions of the cache that do not need to be searched in order to identify cache lines of a particular data type or page color.

At block 510, the processor may evaluate a cache line between the upper and lower bounds to determine if it is the same page color as the specified page color and whether the cache line has been modified. As shown in FIG. 2, this information may be stored in the cache tag entry associated with the cache line. Thus, be evaluating the cache tags, the processor can determine (i) if the cache line is part of the network packet (as indicated by the PTB) and (ii) if the cache line was modified since it was allocated into the cache (as indicated by the line state). If so, at block 515, the processor may write out the modified data in the cache line to other memory elements storing data with the same virtual or physical address before invalidating the cache line. Doing so frees the cache line so that other data may be stored in the cache line and maintains memory coherency as described above.

If, however, the processor determines at block 520 that the cache line is the same color as the specified color but was not modified, at block 525, the processor may invalidate the cache line to indicate that the line is available to store another data chunk. Because the cache line was not modified, the processor may not write out the data stored in the cache line to other memory elements. That is, the data stored in the cache line is the same as the data stored in the other memory elements, and thus, does not need to be sent to those elements. However, in other embodiments, the data stored in the cache line may be transmitted to other memory elements for other reasons. For example, if the network packet is being transmitted to a downstream processing unit in a network device, the cache may transfer the data in the invalidated cache lines directly to the cache of the downstream processing unit.

At block 530, the processor determines if the index of the current cache line being evaluated is the same value as the index stored in the maximum-modified index register. If so, at block 535, the processor transmits a signal to external hardware (e.g., a downstream hardware unit or a different computing device) that the final modified data has been written out. In one embodiment, the signal indicates to the external hardware that there are no additional modified cache lines assigned to the specified page color that have not yet been found in the cache. Stated differently, there are no more cache lines of that page color that need to be written out in order to maintain memory coherency. If we assume that the external hardware is a downstream processor that processes the network packet after the current processor is finished with the packet, the external hardware may have already allocated/stored the data chunks of the network packet into its cache. For example, the external hardware may have received the data chunks from a higher level of cache.

Before beginning to process the packet, however, the external hardware may ensure it has received all the modifications to the network packet made by the current processor. Once the current processor writes out the modifications made to the cache line at the index stored in the maximum-modified index register, the current processor informs the external hardware via the signal that all the modifications made to the network packet have been written out. Thus, once the external hardware receives those modifications, it can immediately begin to process the network packet. In parallel, the current processor can continue to search for, and invalidate, cache lines associated with the network packet that were unmodified. Stated differently, this allows the remainder of the cache search for packet data to overlap with the next stage in packet processing being performed by the external hardware. Thus, the external hardware can begin to process the network packet sooner relative to a computing system where the maximum-modified index was not tracked by the current processor.

At block 540, the processor determines whether all the cache lines between the minimum and maximum indices have been evaluated. If not, at block 545, the processor determines, based on the search technique used, the next cache line (or lines) to evaluate. The method 500 then returns to block 510 to evaluate the next cache line according to the logic shown in blocks 510-535. However, once all the cache lines between the minimum and maximum indices have been evaluated, the method 500 ends. In this manner, the processor may search only a portion of the cache (rather than the entire cache) to evict and/or invalidate the cache lines of a specified page color.

Figure 6:
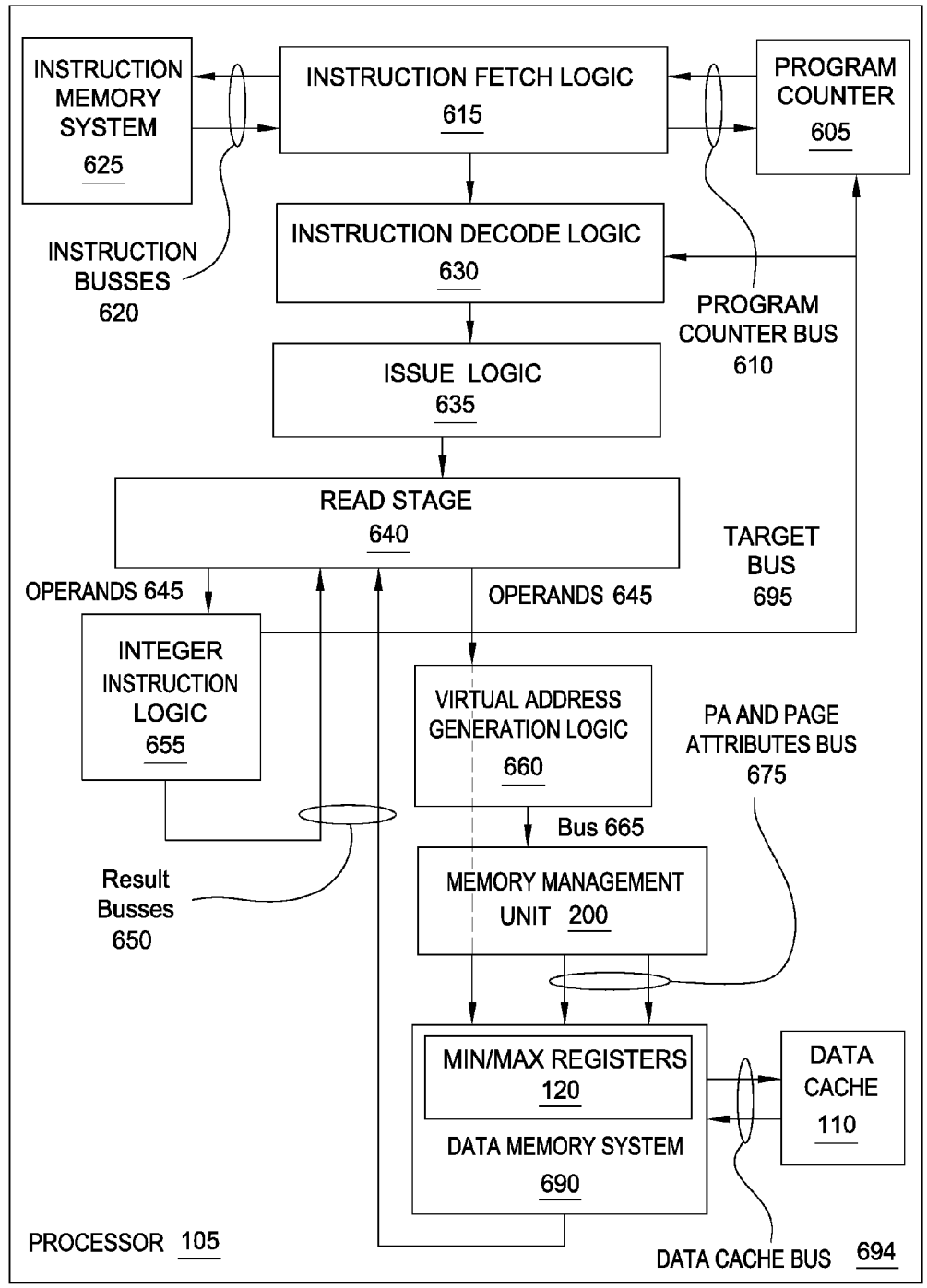
FIG. 6 is a system diagram of a processing unit in the network device, according to one embodiment described herein.

FIG. 6 is a block diagram of a processing unit in the network device of FIG. 1, according to one embodiment described herein. Program counter 605 holds the location in instruction memory for the next instructions to be fetched by processor 105. Program Counter Bus 610 conveys the program counter address to Instruction Fetch Logic 615 and provides updates from Instruction Fetch Logic 615 to Program Counter 605. Instruction Fetch Logic 615 sequences instruction fetches from Instruction Memory System 625, detects exceptions related to instruction fetching, and identifies instruction boundaries. Instruction Busses 620 convey instruction addresses from Instruction Fetch Logic 615 to Instruction Memory System 625 and results from Instruction Memory System 625 back to Instruction Fetch Logic 615. Instruction Memory System 625 may use the addresses from Instruction Busses 620 to look up data representing instruction using, e.g., SRAM or other caches (not shown). Instruction Memory System 625 returns instruction data to Instruction Fetch Logic 615 through Instruction Busses 620. Instruction Fetch Logic 615 sends raw instruction bytes to Instruction Decode Logic 630 to map the raw instruction bytes to control signals used to operate Processor 105. Issue Logic 635 examines the control signals from Instruction Decode Logic 630 and past history to determine if the next instruction should be executed. Based on the result of Issue Logic 635, Read Stage 640 produces operands 645 for Integer Instruction Logic 655 and Virtual Address Generation Logic 660. Results from Integer Instruction Logic 655 and Data Memory System 690 update Read Stage 640 via Result Busses 650. Integer Instruction Logic 655 uses operands 645 and signals from Instruction Decode Logic 630 to evaluate integer operations such as addition, subtraction, shifting, masking, and the like.

Integer Instruction Logic 655 also generates control signals for Target Bus 695 that direct Program Counter 605 to a non-sequential next address when a jump, call, return or branch instruction causes a change program flow. Target Bus 695 is also used by Instruction Decode Logic 630 to identify the first instruction to be decoded from a non-sequential program address. Virtual Address Generation logic 660 uses operands 645 to compute a virtual address using shifting and addition. The virtual address is passed to the MMU 200 over bus 665. MMU 200 reads the virtual address on bus 665 and converts it to a physical address as described above. The physical address and attributes associated with the parent memory page are placed on physical address (PA) and page attributes bus 675. Data Memory System 690 acts on the address from bus 675 and operands 645 to perform memory load and store operations. As shown, the Data Memory System 690 includes the min/max registers 120 discussed earlier for storing the upper and lower bounds of cache lines assigned to a specified page color. Although not shown, the Data Memory System 690 may also include the maximum-modified index register.

Depending on the page attributes from PA and page attributes bus 675, the memory access may use Data Cache 110 and Data Cache Bus 694 to perform the required operation. The results from load operations are returned to Read Stage 640 over Result Busses 650. Processor 105 shown in FIG. 6, however, is only one of many different ways of configuring a processor capable of performing the functions described herein. One skilled in the art will recognize the numerous alternative optimizations and internal configurations of components shown in FIG. 6.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A memory system, comprising:
   a data cache comprising a plurality of cache lines, wherein each of the plurality of cache lines is associated with a respective tag that assigns the plurality of cache lines to a same page type;
   a first register configured to store a minimum cache index associated with the plurality of cache lines;
   a second register configured to store a maximum cache index associated with the plurality of cache lines; and
   logic circuitry configured to:
      perform a plurality of cache allocation operations to store data to the plurality of cache lines,
      determine the minimum cache index stored in the first register and the maximum cache index stored in the second register based upon index values associated with the plurality of cache allocation operations, and
      upon receiving a prompt to remove the plurality of cache lines from the data cache, search a subset of the data cache for the plurality of cache lines assigned to the same page type, wherein an upper boundary of the subset is determined by the maximum cache index and a lower boundary of the subset is determined by the minimum cache index.

2. The memory system of claim 1, further comprising a network device comprising a first hardware unit comprising the data cache, first register, second register, and the logic circuitry, wherein the plurality of cache lines assigned to the same page type store data chunks of a same network packet,
   the network device comprising a second hardware unit configure to receive the network packet after the network packet is processed by the first hardware unit.

3. The memory system of claim 1, wherein the logic circuitry does not search indices of the data cache for the plurality of cache lines assigned to the same page type that are not within the subset of the data cache set by the maximum and minimum cache indices.

4. The memory system of claim 1, wherein the logic circuitry is configured to for each of the plurality of cache allocation operations:
   upon determining that an index value associated with one of the plurality of cache allocation operations is less than a current value of the minimum cache index in the first register, replace the current value of the minimum cache index with the index value, and
   upon determining that the index value is greater than a current value of the maximum cache index in the second register, replace the current value of the maximum cache index with the index value,
   wherein the index value associated with the one cache allocation operation is based on at least one of a set and a way of a cache line associated with the one cache allocation operation.

5. The memory system of claim 1, further comprising:
   a third register configured to store a maximum-modified cache index associated with the plurality of cache lines assigned to the same page type,
   wherein the logic circuitry is configured to:
      perform a cache modification operation to modify data in one of the plurality of cache lines,
      upon determining that a different index value associated with the cache modification operation is greater than a current value of the maximum-modified cache index in the third register, replacing the current value in the third register with the different index value, and upon determining when searching the subset of the data cache that information in a cache tag entry matches the maximum-modified cache index in the third register, transmitting a signal to external hardware indicating that all of the plurality of cache lines of the same page type that have been modified have been found.

6. The memory system of claim 5, wherein the data cache, first register, second register, and third register are integrated into a processor within a computing device.

7. The memory system of claim 1, further comprising a memory management unit configured to translate virtual addresses into physical address, the physical addresses being used to store data chunks into the plurality of cache lines of the data cache,
wherein the data cache is organized into a plurality of sets which each comprise a plurality of ways.

8. The memory system of claim 1, further comprising:
a second data cache comprising a second plurality of cache lines;
a fourth register configured to store a minimum cache index associated with the second plurality of cache lines;
a fifth register configured to store a maximum cache index associated with the second plurality of cache lines; and
second logic circuitry configured to:
perform a second plurality of cache allocation operations to store the plurality of cache lines removed from the data cache into the second data cache, and
determine the minimum cache index stored in the fourth register and the maximum cache index stored in the fifth register based upon index values associated with the second plurality of cache allocation operations.

9. A method comprising:
performing a cache allocation operation to store data to one of a plurality of cache lines in a data cache, wherein each of the plurality of cache lines is associated with a tag that assigns the plurality of cache lines to a same page type;
upon determining that an index value associated with the cache allocation operation is less than a current value of a minimum cache index in a first register, replacing the current value of the minimum cache index with the index value;
upon determining that the index value is greater than a current value of a maximum cache index in a second register, replacing the current value of the maximum cache index with the index value; and
upon receiving a prompt to remove the plurality of cache lines from the data cache, searching a subset of the data cache for the plurality of cache lines assigned to the same page type, wherein an upper boundary of the subset is determined by the maximum cache index and a lower boundary of the subset is determined by the minimum cache index.

10. The method of claim 9, wherein the data cache, first register and second register are integrated into a first hardware unit of a network device, wherein the plurality of cache lines assigned to the same page type store data chunks of a same network packet,
the network device comprising a second hardware unit configure to receive the network packet after the network packet is processed by the first hardware unit.

11. The method of claim 9, wherein indices of the data cache not within the subset of the data cache set by the maximum and minimum cache indices are not searched for the plurality of cache lines assigned to the same page type.

12. The method of claim 9, wherein the index value associated with the cache allocation operation is based on at least one of a set and a way of a cache line associated with the cache allocation operation.

13. The method of claim 9, further comprising:
performing a cache modification operation to modify data in one of the plurality of cache lines assigned to the same page type,
upon determining that a different index value associated with the cache modification operation is greater than a current value of a maximum-modified cache index in a third register, replacing the current value in the third register with the different index value, and
upon determining when searching the subset of the data cache that information in a cache tag entry matches the maximum-modified cache index in the third register, transmitting a signal to external hardware indicating that all of the plurality of cache lines that have been modified have been found.

14. The method of claim 13, wherein the data cache, first register, second register, and third register are integrated into a processor within a computing device.

15. The method of claim 9, wherein a memory management unit is configured to translate virtual addresses into physical address, the physical addresses being used to store data chunks into the plurality of cache lines of the data cache,
wherein the data cache is organized into a plurality of sets which each comprise a plurality of ways.

16. A computing device comprising:
a memory management unit (MMU) configured to associate received virtual addresses with memory pages and page types;
a data cache configured to use physical addresses associated with the memory pages to store data into a plurality of cache lines, wherein a data cache tag memory maintains a page type of a memory page associated with a cached address;
a first register configured to store a lower boundary of a subset of the data cache that stores a first set of cache lines assigned to a same page type;
a second register configured to store a upper boundary of the subset of the data cache;
hardware logic configured to update the first and second registers in response to cache line allocations associated with the first set of cache lines assigned to the same page type; and
control logic that uses the upper and lower boundaries to search the subset of the data cache for modified and unmodified cache lines of the same page type.

17. The computing device of claim 16, further comprising a network device comprising a first hardware unit comprising the MMU, data cache, first register, second register, hardware logic, and control logic, wherein the first set of cache lines assigned to a same page type store data chunks of a same network packet,
the network device comprising a second hardware unit configure to receive the network packet after the network packet is processed by the first hardware unit.

18. The computing device of claim 16, wherein the control logic does not search indices of the data cache for the first set of cache lines assigned to the same page type that are not within the subset of the data cache set by the lower and upper boundaries.

19. The computing device of claim 16, wherein the lower and upper boundaries are based on at least one of a set and a way of a cache line associated with at least one of cache line allocations and a direct tag access operation.

20. The computing device of claim 16, further comprising:
a third register configured to store a maximum-modified boundary that is between the lower and upper boundaries in the subset of the data cache,
wherein the control logic is configured to use the maximum-modified boundary to provide a signal to a separate hardware unit, the signal indicating that all of the first set of cache lines of the same page type that have been modified have been found.

21. The computing device of claim 16, wherein the minimum and maximum registers are readable by a software application executing in the computing device.

* * * * *